United States Patent [19]

Najjar et al.

[11] Patent Number: 5,183,482
[45] Date of Patent: Feb. 2, 1993

[54] SEPARATION BY MEMBRANE TECHNIQUES

[75] Inventors: Mitri S. Najjar, Wappingers Falls; Martin D. Hilmar, Beacon, both of N.Y.

[73] Assignee: Texaco Inc., White Plains, N.Y.

[21] Appl. No.: 717,790

[22] Filed: Jun. 19, 1991

[51] Int. Cl.$^5$ .................... B01D 53/22; B01D 71/02
[52] U.S. Cl. .................................. 55/16; 55/68; 55/158
[58] Field of Search ............... 55/16, 68, 158, 524

[56] References Cited

U.S. PATENT DOCUMENTS

| | | | |
|---|---|---|---|
| 2,627,933 | 2/1953 | Teter | 55/158 |
| 4,329,157 | 5/1982 | Dobo et al. | 55/158 X |
| 4,971,696 | 11/1990 | Abe et al. | 55/158 X |

FOREIGN PATENT DOCUMENTS

| | | | |
|---|---|---|---|
| 2550953 | 3/1985 | France | 55/158 |
| 53-099078 | 8/1978 | Japan | 55/16 |
| 59-055314 | 3/1984 | Japan | 155/158 |
| 59-059223 | 4/1984 | Japan | 55/158 |
| 59-059224 | 4/1984 | Japan | 55/158 |
| 59-098706 | 6/1984 | Japan | 55/158 |
| 59-102403 | 6/1984 | Japan | 55/158 |
| 59-107988 | 6/1984 | Japan | 55/158 |
| 59-147605 | 8/1984 | Japan | 55/158 |
| 59-150508 | 8/1984 | Japan | 55/158 |
| 59-179112 | 10/1984 | Japan | 55/158 |
| 61-209005 | 9/1986 | Japan | 55/158 |
| 61-238303 | 10/1986 | Japan | 55/158 |
| 63-049220 | 3/1988 | Japan | 55/158 |
| 1-281119 | 11/1989 | Japan | 55/158 |
| 1-310714 | 12/1989 | Japan | 55/158 |
| 0604826 | 9/1978 | Switzerland | 55/16 |

Primary Examiner—Robert Spitzer
Attorney, Agent, or Firm—Robert A. Kulason; James J. O'Loughlin; Carl G. Seutter

[57] ABSTRACT

Mixture of gases such as hydrogen/carbon dioxide may be separated by use of membrane formed by reaction of an aluminum alkoxide with steam at high temperatures and pressures.

15 Claims, No Drawings

SEPARATION BY MEMBRANE TECHNIQUES

FIELD OF THE INVENTION

This invention relates to novel membranes and to the method of preparation of these membranes. More particularly it relates to a method of separating charge mixtures which contain several components to permit attainment of product stream which is enriched with one of the components.

BACKGROUND OF THE INVENTION

As is well known to those skilled in the art, it is possible to treat charge mixtures by various techniques in order to recover one (or more) components in enriched or in pure form. In the case of liquids, this may commonly be effected by distillation or adsorption. In the case of gases, it is possible to effect separation by absorption or adsorption or by distillation of the liquified gases.

Although prior art attempts to separate gases, such as mixtures of hydrogen and carbon dioxide, by use of membrane technology have been heretofore considered, they have not been successful for many reasons. Among these may be noted the failure of the membranes due to mechanical defects (e.g. cracking) or the attainment of undesirably low Separation Factors and/or Flux.

It has also been difficult-to-impossible to fabricate membranes to be used in these processes because the fabrication processes were slow, difficult to control, produced unsatisfactory membranes, or required undesirable reagents (e.g. large quantities of water).

It is an object of this invention to provide a method of forming a membrane of an oxide of aluminum characterized by its ability, when formed as a membrane, to separate components of charge streams. Other objects will be apparent to those skilled in the art.

STATEMENT OF THE INVENTION

In accordance with certain of its aspects, this invention is directed to a method of forming a membrane of an oxide of aluminum which comprises contacting an aluminum alkoxide with steam in the presence of an acid peptizing agent at elevated decomposition temperature and pressure thereby decomposing said alkoxide and forming a peptized hydrolyzed sol containing high purity alumina containing aluminum-oxygen repeating units;

depositing said peptized hydrolyzed sol containing high purity alumina containing aluminum-oxygen repeating units on a support thereby forming a high purity alumina membrane on said support; and recovering said high purity membrane on said support.

DESCRIPTION OF THE INVENTION

The substrate or support which may be used in practice of the process of this invention may be a permeable composition which is stable under the conditions of preparation and operation. The preferred substrates may be ceramic supports formed of alumina, silica, silica-alumina, zirconia, silica-zirconia, alumina-zirconia, titania, silica-titania, alumina-titania, etc. The preferred ceramic permeable support may be alumina, preferably alpha alumina, in the form of a disk or plate, a cylinder or tube, etc. Less preferred may be porous supports formed of carbon, mullite, cordierite, zeolites, or metals such as silver, stainless steel, etc.

The membrane layers of this invention may be formed on the support by use of a charge composition of aluminum alkoxide. Although it may be possible to prepare the novel membranes of this invention from a mono-alkoxide Al(OR)X$_2$ (wherein X represents another inert group) or from a dialkoxide Al(OR)$_2$X, it is preferred to utilize, as charge, a tri-alkoxide characterized by the formula Al(OR)$_3$.

In the above formula, R may be a hydrocarbon group selected from the group consisting of alkyl, aralkyl, cycloalkyl, aryl, and alkaryl including such radicals when inertly substituted. When R is alkyl, it may typically be methyl, ethyl, n-propyl, iso-propyl, n-butyl, i-butyl, sec-butyl, amyl, octyl, decyl, octadecyl, etc. When R is aralkyl, it may typically be benzyl, beta-phenylethyl, etc. When R is cycloalkyl, it may typically be cyclohexyl, cycloheptyl, cyclooctyl, 2-methylcycloheptyl, 3-butylcyclohexyl, 3-methylcyclohexyl, etc. When R is aryl, it may typically be phenyl, naphthyl, etc. When R is alkaryl, it may typically be tolyl, xylyl, etc. R may be inertly substituted i.e. it may bear a non-reactive substituent such as alkyl, aryl, cycloalky, ether, etc. Typically inertly substituted R groups may include 2-ethoxyethyl, carboethoxymethyl, 4-methylcyclohexyl, etc. The preferred R groups may be lower alkyl, i.e. C$_1$-C$_{10}$ alkyl, groups including e.g. methyl, ethyl, n-propyl, i-propyl, butyls, amyls, hexyls, octyls, decyls, etc. R may preferably be isopropyl or sec-butyl.

The preferred aluminum alkoxides are those lower aluminum alkoxides (wherein all the R groups are the same). Most preferred are aluminum tri-sec-butoxide and aluminum tri-iso-propoxide. It is preferred to utilize the lower alkoxides because they are generally liquids at temperature of operation and for economic reasons (i.e. they contain a larger relative content of alumina). Aluminum alkoxides are readily available commercially from various suppliers including Aldrich, Fisher, or Johnson Matthey.

In practice of the process of this invention, the charge e.g. Al(OR)$_3$ (referred to as an alkoxide, for convenience) is employed in liquid state. In the case of the higher alkoxides (typified by Al(OR)$_3$ wherein R is octadecyl) which are solid at operating temperature, they may be employed in admixture with an alcohol, preferably ROH i.e. wherein the R group is lower C$_1$-C$_5$ alkyl.

To the charge alkoxide (100 parts) at temperature of 100° C.–275° C., say 145° C., there is added 100–500, preferably 200 parts of liquid alcohol typically a lower C$_1$-C$_5$ alkanol such as isopropanol, and 0.5–7 parts, say 1 part of acid peptizing agent. Typical acid peptizing agents may include nitric acid, oxalic acid, or sulfuric acid. The preferred acid peptizing agent may be nitric acid.

The charge alkoxide liquid, containing peptizing agent, is hydrolyzed by contact with steam at 100° C.–275° C., say 156° C. and 1–150 psig, say 29 psig. During reaction over 0.5–30 minutes, say 20 minutes, the aluminum alkoxide is decomposed by the steam to yield alcohol and alkoxide in which some of the alkoxide groups have been replaced by —OH groups:

Al(OR)$_3$+H$_2$O(g)→Al(OR)$_2$OH+ROH

This reaction typically proceeds further to yield hydrolyzed polymer product $$n\ Al(OR)_2OH + H_2O(g) \rightarrow n\text{-}2\ ROH + RO\text{-}[\text{-}Al\text{-}O\text{-}]_{n\text{-}1}Al\text{-}OR$$

wherein n may be 100–10,000,000 say 10,000.

The hydrolyzed product of the reaction may be considered a stabilized/peptized colloidal sol of alumina in admixture with the alcohol originally present plus that formed during reaction. The alumina may bear RO-groups on the chain or more likely in terminal position. The alumina in the sol may be characterized by x-ray diffraction and nitrogen porosimetry. The hydrolyzed alumina sol contains gamma alumina with a Pore Mode of typically 4–45Å, preferably 7–15Å, say 13.6Å and a BET surface area of typically 150–400 m²/g, typically 160–310 m²/g, say 175 m²/g. Preferably >70% of the Pores are <14Å radius.

Prior to formation of the alumina membrane on a support, it is desirable to prewet the support as with an alcohol ROH, preferably methanol or ethanol.

Preparation of an alumina membrane assembly from the stabilized sol may be effected by various techniques. If it be desired to coat e.g. the inside of a tubular or cylindrical microporous support, the sol in liquid phase may be steam sprayed through the tubular or cylindrical support to form thereon a membrane of alumina over 10–10, say 1.9 minutes at 50° C.-200° C., say 156° C. In another embodiment, the sol may be steam treated during preparation prior to deposition e.g. on the inside of the tube of alumina.

In still another embodiment, the sol may be deposited on the support and thereon contacted with steam at desired temperature and pressure. In another embodiment, the sol (containing water) may be deposited and steam treatment may be effected by reducing the pressure to generate steam in situ. In another embodiment the stabilized sol liquid may be poured as a thin layer on a flat surface. Excess liquid may be removed by drying at 50° C.-90° C., say 60° C. for 12–36 hours, say 24 hours followed by calcining at 400° C.-600° C., say 400° C. for 24–48 hours, say 34 hours.

Supported alumina membranes may be formed by coating a thin microporous support (formed typically of alpha alumina, carbon, porous glass, etc.) with the sol to attain a thin film on the surface thereof. This film-membrane may be dried at 50° C.-90° C., say 60° C. for 12–36 hours, say 24 hours, and then calcined at 400° C.-600° C., say 400° C. for 24–48 hours, say 34 hours.

In any of these embodiments, the sol-generated membrane may be formed on an intermediate layer on the support. For example, it may be desirable to have (i) a microporous support of alpha alumina, bearing (ii) an intermediate layer of aluminum oxide (formed thereon e.g. by contact with an aqueous sol of gamma alumina which is dried at 50° C.-90° C., say 60° C. for 12–36 hours, say 2 hours followed by calcining at 250° C.-400° C., say 400° C. for 24–48 hours, say 34 hours) and (iii) a separating membrane layer of this invention.

When desired, the deposition process may be repeated one or more additional times to obtain membranes of increasing thickness.

The separating membrane layer of this invention so prepared is typically characterized by a thickness of 0.5–25, say 4 microns. When an intermediate layer is present, it may be characterized by a thickness of 10–150, say 25 microns.

The membranes prepared by the process of this invention are typically characterized (by a high surface area and a narrow Pore Size Distribution) as follows:

TABLE

| Property | Broad | Narrow | Preferred |
|---|---|---|---|
| Surface Area by | | | |
| Cumulative Desorption m²/g | 4–400 | 100–350 | 310 |
| Multi-point BET m²/g | 150–400 | 160–310 | 175 |
| Pore Volume cc/g for: | | | |
| Pores <1857.2A at P/Po = 0.005 | 3.5–80 | 20–30 | 27 |
| Cumulative Desorption 300A-12.5A radius | 2–100 | 5–25 | 19 |
| Pore Mode | 4–45 | 7–15 | 13.6 |
| Porosity % | 43–54 | 45–51 | 49% |

Preferably at least about 70% of the Pores have a Pore Radius of <14Å.

The membrane system so prepared may be used to separate liquids typified by methanol-water (Separation Factor of 5–8, say 6.2) or ethanol-water (Separation Factor of 8–11, say 9.3) or isopropanol-water (Separation Factor of 10–13, say 11.6).

In accordance with certain of its preferred aspects, this invention is directed to a method of separating a charge gas mixture containing a more permeable gas and a less permeable gas which comprises passing a charge gas mixture containing a more permeable gas and a less permeable gas into contact with a membrane of a high purity alumina containing aluminum-oxygen repeating units;

maintaining a pressure on the charge side of said membrane greater than the pressure on the permeate side of said membrane thereby yielding a permeate containing increased quantity of said more permeable gas and decreased quantity of said less permeable gas and a retentate containing decreased quantity of said more permeable gas and an increased quantity of said less permeable gas;

recovering said permeate containing increased quantity of said more permeable gas and decreased quantity of said less permeable gas; and recovering said retentate containing decreased quantity of said more permeable gas and an increased quantity of said less permeable gas.

The separations membranes prepared by the process of this invention, whether on a supporting membrane or other structure, are particularly characterized by their ability to separate charge gas streams into their several components. For example, it is possible to treat gas streams containing various combinations of gases such as hydrogen, nitrogen, carbon monoxide, carbon dioxide, ammonia, hydrogen sulfide, hydrocarbons, inert gases, etc. to yield a product which is desirably enriched (or depleted) in one of the components. Typical charge systems which may be treated include hydrogen/carbon dioxide, hydrogen/nitrogen, nitrogen/carbon dioxide, etc. It is preferred that the charge stream be dry i.e. that it contain less than about 100 ppm of water and that it be free of strongly acid gases such as hydrogen chloride i.e. less than about 1 ppm.

Separation of the charge gas may be effected by passing the charge gas at 10° C.-500° C., say 170° C. and 1–600 psig, say 25 psig into contact with the membrane at a flow rate of 15–110 moles/sec, say 75 moles/sec.

During typical operation, charge containing say hydrogen (40 v %) and carbon dioxide (69 v %) may yield permeate containing 97 v % hydrogen and 3 v % carbon dioxide at a Flux of 270–1900, say 978 moles/cm$^2$ sec, and a Separation Factor of 5–10 say about 5.6. Satisfactory commercial operation typically is attained with a Separation Factor of 4.9.

ADVANTAGES OF THE INVENTION

Among the advantages and characteristics of this invention may be noted the following:
1. It permits preparation and application of a charge sol in a matter of minutes.
2. Membrane generation is effected in the presence of no added water - so that this need not be removed during treatment (removal of any substantial quantity of water tends to crack the membrane).
3. The formed membrane can be used at high or low temperature with little or no evidence of cracking or other deterioration.
4. Charge mixtures can readily be separated at high Flux and Selectivity.
5. The formed membrane typically has a narrow pore size distribution e.g. >70% of the pores are <14Å radius, i.e. the Pore Mode is less than about 14Å.
6. Utilization of steam under pressure speeds the decomposition/hydrolysis of the alkoxide and facilitates mixing of the alkoxide with e.g. precursors of titania or zirconia (which latter are found to hydrolyze at a high rate).
7. The membrane is characterized by a highly homogeneous structure which is particularly able to be formed at a fast rate and which therefore permits deposition on multichannel or honeycomb structures.

DESCRIPTION OF PREFERRED EMBODIMENTS

Practice of the process of this invention may be apparent to those skilled in the art from the following wherein all parts are parts by weight unless otherwise indicated. An asterisk indicates a control example.

EXAMPLE I

In this example which sets forth the best mode presently known of carrying out the process of this invention, the substrate on the inside of which the alumina is to be deposited is a tube of alpha alumina of 10 mm outside diameter, 1.5 mm thickness, and 750 mm length (as manufactured by Alcoa under the trademark Membralox.

The sol is prepared by mixing 100 parts of aluminum tri-iso-propoxide and 200 parts of isopropanol with 1 part of nitric acid peptizer. Hydrolysis is effected by passing steam (156° C./29 psig) through the mixture at a rate of 300 cc/sec for 20 minutes.

The hydrolyzed stabilized sol is passed into contact with the inside of the tube wherein it is maintained for 1.9 minutes at 156° C. The liquid is gently poured off and the tube is heated (ca 10° C./hr) to 400° C. at which temperature it is maintained for 34 hours.

The product membrane (8 microns thick) is characterized as follows:

TABLE

| Property | Value |
| --- | --- |
| Porosity | 49% |
| Surface m$^2$/g (BET) | 175 |
| Pore Mode Å | 13.6 |

The so-prepared membrane system is cooled to room temperature and inspected. There is then admitted to the interior of the tube at 125° C. and 15 psig, charge gas containing 45 v % hydrogen and 55 v % carbon dioxide. After 1.5 hours operation, it is found that a permeate gas is recovered containing 95 v % hydrogen and 5 v % carbon dioxide.

This corresponds to a Separation Factor of 5.9, and a Flux of 1055 moles/sec cm$^2$.

EXAMPLES II–VIII

Results comparable to those obtained with Example I may be attained if the charge gas is (in 50 v/50 v) mixtures):

| | | Separation Factor at Charge Pressure | |
| --- | --- | --- | --- |
| Example | Gas | 10 psig | 5 psig |
| I | H$_2$/CO$_2$ | 5.9 | |
| II | H$_2$/CO$_2$ | | 5.8 |
| III | H$_2$/CO$_2$ | 5.7 | |
| IV | H$_2$/CO$_2$ | | 5.5 |
| V | H$_2$/N$_2$ | 3.6 | |
| VI | H$_2$/N$_2$ | | 4.7 |
| VII | N$_2$/CO$_2$ | 2.1 | |
| VIII | N$_2$/CO$_2$ | | 2.0 |
| IX | H$_2$/He | 4.7 | |
| X | H$_2$/He | | 4.5 |

Results comparable to those attained in Example I may be attained if the R group of the aluminum trialkoxide Al(OR)$_3$ is as follows:

TABLE

| Example | Alkoxide |
| --- | --- |
| XI | sec-butoxide |
| XII | phenoxide |
| XIII | benzyloxide |
| XIV | methoxide |

Although this invention has been illustrated by reference to specific embodiments, it will be apparent to those skilled in the art that various charges and modifications may be made which clearly fall within the scope of the invention.

What is claimed:
1. The method of separating a charge gas mixture containing a more permeable gas and a less permeable gas which comprises
    passing a charge gas mixture containing a more permeable gas and a less permeable gas into contact with a membrane of a high purity alumina containing aluminum-oxygen repeating units and bearing alkoxide groups;
    maintaining a pressure on the charge side of said membrane greater than the pressure on the permeate side of said membrane thereby yielding a permeate containing increased quantity of said more permeable gas and decreased quantity of said less permeable gas and a retentate containing decreased quantity of said more permeable gas and an increased quantity of said less permeable gas;
    recovering said permeate containing increased quantity of said more permeable gas and decreased quantity of said less permeable gas; and
    recovering said retentate containing decreased quantity of said more permeable gas and an increased quantity of said less permeable gas.

2. A method of separating a charge gas mixture containing a more permeable gas and a less permeable gas which comprises passing a charge gas mixture containing a more permeable gas and a less permeable gas into contact with a membrane of a high purity alumina containing aluminum-oxygen repeating units;

maintaining a pressure on the charge side of said membrane greater than the pressure on the permeate side of said membrane thereby yielding a permeate containing increased quantity of said more permeable gas and decreased quantity of said less permeable gas and a retentate containing decreased quantity of said more permeable gas and an increased quantity of said less permeable gas;

recovering said permeate containing increased quantity of said more permeable gas and decreased quantity of said less permeable gas; and recovering said retentate containing decreased quantity of said more permeable gas and an increased quantity of said less permeable gas.

3. A membrane comprising a high purity alumina containing aluminum-oxygen repeating units and bearing alkoxide groups and characterized by a narrow pore size distribution wherein >70% of the pores have a radius less than about 12 A and the BET surface area is 150–400 m$^2$/g.

4. A membrane comprising a high purity alumina aluminum-oxygen repeating units and bearing alkoxide groups and being characterized by a narrow pore size distribution wherein >70% of the pores have a radius less than about 12A and the BET surface area is 150–400 m$^2$/g, prepared by the process which comprises contacting an aluminum alkoxide with steam in the presence of an acid peptizing agent at elevated decomposition temperature and pressure thereby decomposing said alkoxide and forming a peptized hydrolyzed mixture containing high purity alumina containing aluminum-oxygen repeating units;

depositing said peptized hydrolyzed mixture containing high purity alumina containing aluminum-oxygen repeating units and bearing alkoxide groups on a support thereby forming a high purity alumina membrane on a support; and recovering said high purity membrane on said support.

5. The method of forming a membrane of an oxide of aluminum which comprises contacting an aluminum alkoxide with steam in the presence of an acid peptizing agent at elevated decomposition temperature and pressure thereby decomposing said alkoxide and forming a peptized hydrolyzed mixture containing high purity alumina containing aluminum-oxygen repeating units;

depositing said peptized hydrolyzed mixture containing high purity alumina containing aluminum-oxygen repeating units and bearing alkoxide groups on a support thereby forming a high purity alumina membrane on a support; and recovering said high purity membrane on said support.

6. The method of for a membrane of an oxide of aluminum as claimed in claim 5 wherein said aluminum alkoxide is characterized by the formula Al(OR)$_3$ wherein R is alkyl, alkaryl, aralkyl, cycloalkyl, or aryl.

7. The method of forming a membrane of an oxide of aluminum as claimed in claim 5 wherein said aluminum alkoxide is a lower alkoxide.

8. The method of forming a membrane of an oxide of aluminum as claimed in claim 5 wherein said aluminum alkoxide is aluminum tri-isopropoxide.

9. The method of forming a membrane of an oxide of aluminum as claimed in claim 5 wherein said aluminum alkoxide is aluminum tri sec-butoxide.

10. The method of for a membrane of an oxide of aluminum as claimed in claim 5 wherein said peptizing agent is nitric acid, oxalic acid, acetic acid, or sulfuric acid.

11. The method of for a membrane of an oxide of aluminum as claimed in claim 5 wherein said peptizing agent is nitric acid.

12. The method of forming a membrane of an oxide of aluminum as claimed in claim 5 wherein said elevated decomposition temperature is 100° C.–275° C. at a pressure of 1–150 psig.

13. The method of for a membrane of an oxide of aluminum as claimed in claim 5 wherein said high purity alumina contains residual alkoxide.

14. The method of for a membrane of an oxide of aluminum as claimed in claim 5 wherein said support is an alumina support.

15. The method of forming a membrane of aluminum oxide comprises contacting aluminum tri-isopropoxide or aluminum sec-butoxide with steam in the presence of nitric acid peptizing agent at elevated decomposition temperature of 100° C.–275° C. and pressure of 1–150 psig thereby decomposing aluminum tri-isopropoxide or aluminum tri-sec-butoxide and forming a peptized hydrolyzed mixture containing high purity alumina containing aluminum-oxygen repeating units and bearing isopropoxide or sec-butoxide groups;

depositing said peptized hydrolyzed mixture containing high purity alumina containing aluminum-oxygen repeating units and bearing isopropoxide or sec-butoxide terminal groups on a support thereby forming a high purity membrane on a support; and recovering said high purity membrane on said support.

* * * * *